United States Patent [19]

Ligh

[11] Patent Number: 5,443,090

[45] Date of Patent: Aug. 22, 1995

[54] MODULAR PILOT OPERATED VENT ACTUATOR

[76] Inventor: Jone Y. Ligh, P.O. Box 420509, Houston, Tex. 77242-0509

[21] Appl. No.: 224,797

[22] Filed: Apr. 8, 1994

[51] Int. Cl.$^6$ .............................................. F16K 17/10
[52] U.S. Cl. ..................................... 137/489; 137/494
[58] Field of Search .............................. 137/489, 494

[56] References Cited

U.S. PATENT DOCUMENTS

| | | | |
|---|---|---|---|
| 3,075,544 | 1/1963 | Heideman | 137/489 X |
| 3,583,432 | 6/1971 | Powell | 137/489 |
| 4,368,872 | 1/1983 | Machat | 137/489 X |
| 4,445,531 | 5/1984 | Powell | 137/489 |
| 5,163,471 | 11/1992 | Powell | 137/489 X |
| 5,249,593 | 10/1993 | Higgins | 137/489 X |

OTHER PUBLICATIONS

Loose Leaf Catalogue Pages of Anderson, Greenwood & Co. Catalog 3-1900-89 & 3-9000-89, Nov. & Dec. 1989 (Marked as Exhibit A, A2, A3, A4, A5, A6 and A7).

Loose Leaf Catalogue Pages of The Protectoseal Company 1990, 1985 (marked as Exhibit B, B2, B3, B4, B5, B6 and B7).

Loose Leaf Catalogue Pages of Groth Corporation 1988 (Marked as Exhibit C, C2, C3, C4, C5, C6, C7, C8 and C9).

*Primary Examiner*—Robert G. Nilson
*Attorney, Agent, or Firm*—Kenneth H. Johnson

[57] ABSTRACT

A pilot actuator and a pilot actuated tank vent valve that comprises: (a) a vent valve body having a pallet which seats on a nozzle to seal the valve; (b) a pallet actuator mounted on the vent valve body and mechanically linked to the pallet, the upper surface of the pallet actuator being in fluid communication with the pressure in the tank through; (c) a pilot valve mounted on the diaphragm actuator and having (1) a spring loaded sensing actuator, (2) a spindle connected to and operated by the sensing actuator, (3) an inlet port in fluid communication with the pressure in the tank, (4) a first passageway for communicating the pressure from the inlet port to the pallet actuator (5) a second passageway for communicating the pressure from the inlet port to the under side of the sensing actuator and (6) a seating mechanism connected to the spindle for sealing an opening between the first passageway and an outlet port, the first passageway being offset from the inlet port and preferably laterally to the second passageway such that any fluid flowing through the inlet port and along the second passageway must pass the opening of the first passageway. The pilot actuated tank vent valve fails in the open position because the passageway from the pilot inlet to the vent valve actuator is offset from the pilot inlet such that fluid passing to the sensing diaphragm of the pilot must pass the opening to the passageway to the vent valve actuator such that if the sensing diaphragm ruptures the flow through the rupture will cause a decrease in pressure on the vent valve actuator diaphragm allowing the vent to open. Additionally, the pilot spindle is terminated in a ball and socket or other self aligning arrangement so that the valve will still seat if the spindle is slightly misaligned.

20 Claims, 4 Drawing Sheets

MODULAR PILOT OPERATED VENT ACTUATOR

BACKGROUND OF THE INVENTION

1. Field of the Invention

The present invention generally relates to tank venting valves for relieving the internal pressure in tanks at a predetermined pressure. More particularly, the invention relates to pilot operated tank vent valves. Most particularly, the invention relates to a pilot operated actuator that is adaptable to fit on tank venting valves and which is designed to open the tank venting valve in event of failure.

2. Related Art

There are several types of pressure relief valves for atmospheric or low pressure storage tanks. One of the basic designs is known as a "weight loaded tank vent". The design utilizes a weighted cover over a nozzle. The cover, also known as a pallet, forms a barrier to the nozzle opening. The weight of the pallet determines at what pressure the pallet will lift open to relieve pressure in the tank. The opening pressure is known as the "set pressure". The set pressure can easily be determined by dividing the weight of the pallet assembly by the open area of the nozzle. If a higher set pressure is desired more weight is added to the pallet.

Another type of pressure relieving device is a spring loaded tank vent. The spring loaded type is used for set pressures above that which is practical for weight loaded operation due to either a high set pressure where there is not enough room for the weights on the pallet, or where the size of the vent nozzle dictates a large weight on the pallet.

A third type of tank vent is pilot operated. Pilot operated tank vents utilize the tank pressure acting on an area larger than the nozzle area to create a higher downward force to hold down a pallet or seat plate against the tank pressure. For this reason pilot operated tank vents seal tighter than weight or spring loaded vents until the set or opening pressure is reached. The set pressure is adjustable by means of a spring in the pilot.

Any of the three types may be vented to the atmosphere or piped into headers for vapor recovery or burning. It is a feature of the present pilot operated valve that it will fail in the open position in the event of component failure. The design of the actuator allows easy retrofit of most existing weight or spring loaded tank vents to be pilot operated vents in a "piggy back" fashion, which allows for easy access to the main valve, actuator or pilot for repairs or maintenance. These and other features and advantages will become apparent from the following descriptions.

SUMMARY OF THE INVENTION

Briefly the present invention provides a pilot actuator and a pilot actuated tank vent valve that comprises in combination:

(a) a vent valve body having a pallet which seats on a nozzle to seal the valve;

(b) a pallet actuator mounted on said vent valve body and having a pressure responsive member, such as a diaphragm or bellows, mechanically linked to said pallet, the upper surface of the pressure responsive member being in fluid communication with the pressure on said tank through;

(c) a pilot valve mounted on said pallet actuator and having (1) a spring loaded sensing actuator, (2) a spindle connected to and operated by said sensing actuator, (3) an inlet port in fluid communication with the pressure in said tank, (4) a first passageway for communicating said pressure from said inlet port to said pallet actuator, (5) a second passageway for communicating said pressure from said inlet port to the under side of said sensing actuator and (6) a seating mechanism connected to said spindle for sealing an opening between said first passageway and an outlet port, said first passageway being offset from said inlet port and preferably laterally to the second passageway such that any fluid flowing through said inlet port and along the second passageway must pass the opening of said first passageway.

The fail open feature of the pilot of the invention is provided by offsetting the passageways from the pilot inlet to the actuator diaphragm respectively. Fluid traveling into the inlet must pass by the actuator passageway on its way up to the pilot diaphragm. After the pressure is balanced there is normally no flow up into the pilot diaphragm. If the pilot diaphragm ruptures fluid flowing by the actuator passageway to the rupture will cause a venturi effect lowering the pressure on the actuator diaphragm allowing the vent valve to open.

The piggy back mounting is accomplished by a spacer element between the actuator and the vent valve. The spacer allows for easy removal of the actuator and pilot for access to the vent valve.

PREFERRED EMBODIMENT

Figure 1:
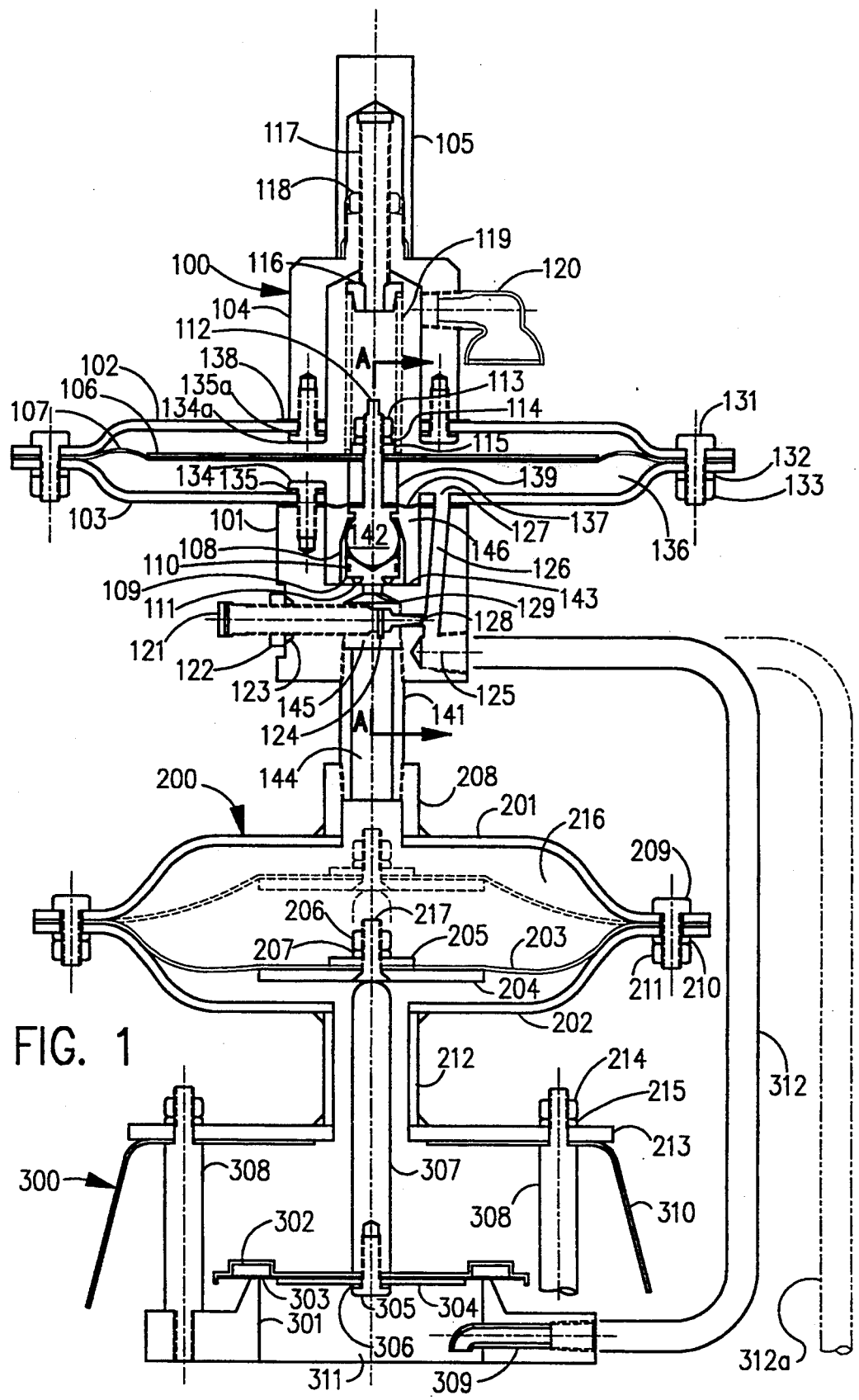
FIG. 1 is an elevational view in partial cross section of one embodiment of the invention.

A detailed description of a preferred embodiment is provided by reference to the FIG.'s. The same indicia have been used for the same elements appearing in the various embodiments shown in the drawings.

Referring first to FIG. 1 there is shown an elevational view in partial cross section of one embodiment of a pilot operated actuator mounted on a tank vent valve. Typical components of a tank vent valve 300 include a weather hood 310 mounted to the tank (not shown) having a nozzle 311 therethrough which acts as the outlet to vent the vapors in the tank. A pallet 302 seats on the valve body 301 to cover the nozzle 311. A diaphragm 303 is disposed on the under side of the pallet 302 and supported there by support plate 304. Holding the support plate 304 and diaphragm 303 to the under side of the pallet 302 is a bolt 305 and lock washer 306. The bolt 305 passes through the support plate 304, diaphragm 303 and pallet 302 and threadedly engaged with a stem 307. A weather hood 310 is disposed over the whole and is supported by mounting posts 308 which are threadedly engaged in valve body 301. A pressure sensing tube 309 is located within the nozzle 311.

The actuator 200 is secured to the vent valve 300 by mounting plate 213 which is secured to the top of the mounting posts 308 by nuts 214 and lock washers 215. A cylindrical spacer in the form of a nipple 212 is secured to mounting plate, usually by welding, and to lower actuator case 202. Upper actuator case 201 is secured to lower actuator case 202 by bolts 209, nuts 211 and lock washers 210 securing actuator diaphragm 203 to form actuator chamber 216 between elements 201 and 203. Disposed within the actuator chamber 216 is actuator diaphragm 203 which is secured to diaphragm support plate 204 by screw 217, nut 206, washer 205 and lock washer 207. The head of the screw 217 normally rests against the upper end of the stem 307 applying pressure to the upper surface of vent valve pallet 302.

On the upper surface of the upper actuator case 201 is a cylindrical coupling 208 to which is secured the pilot 100 by nipple 141 which threadedly engages upper actuator diaphragm case and cylindrical body 101 of pilot 100, which provides a conduit 144 between the pilot and the pallet actuator. The lower pilot diaphragm case 103 is secured on the upper end of the body 101 by bolts 134 and lock washers 135. A seal diaphragm 137 is disposed between the body 101 and the lower diaphragm case 103. Upper pilot diaphragm case 102 is secured to lower pilot diaphragm case 103 by bolts 131, nuts 133 and lock washers 132 securing sense diaphragm 107 to form pilot sense chamber 136 between elements 103 and 107. A cylindrical spring bonnet 104 is secured to the upper surface of upper pilot diaphragm case 102 by bolts 134a and lock washers 135a with gasket 138 sealing around the bonnet. An adjusting screw 117 is threadedly engaged through the top of spring bonnet 104 and is in contact with spring button 116 within the spring bonnet 104. A lock nut 118 is provided about adjusting screw 117 to secure it in the desired position. A cap 105 is threadedly engaged to the top of the spring bonnet 104 to cover and protect the adjusting screw. The area above the sense diaphragm 107 is vented through vent bug screen 120.

Spring 119 rests inside spring bonnet 104 between spring button 116 and pilot diaphragm support plate 106. The lower end of the spring 119 rests about lower spring guide 115. A spacer 139 is disposed between seal diaphragm 137 and sense diaphragm 107. Spindle 112 passes through lower spring guide 115, diaphragm support plate 106, sense diaphragm 107, spacer 139 and seal diaphragm 137 and is secured in place by nut 113 and lock washer 114.

The lower end of spindle 112 terminates in a ball 142 which rests in a socket which is comprised of the outer seat retainer 108 and inner seat retainer 109. An O ring seal 110 is disposed between outer and inner seat retainers in groove 110a. The O ring 111 is disposed on the under side of inner seat retainer 109 in a groove 111a. The O ring 111 seats against surface 143 in pilot body 101. The ball and socket arrangement allows for slight misalignment between the spring bonnet, pilot diaphragm case and seat. Without the ball (any configuration) and socket arrangement (or other self-alignment arrangement such as a flexible shaft, universal jointed shaft, bellows shaft, spring shaft, or the like which are not shown) any slight misalignment of these elements would result in a leak at the seat.

Inlet port 125 to pilot valve is connected to the pressure sensing tube 309 via conduit 312 or to a remote sensing point via tubing 312a shown in dashed lines. Pilot valve body 101 is in fluid connection to upper actuator chamber 216 via nipple 141. Passageway 128 leads from inlet passageway 126 past blowdown needle 121 into cylindrical chamber 145. Blowdown needle 121 never completely seals against the inside of the cylindrical chamber but provides an adjustable restriction for fluid passage between inlet passageway 126 and chamber 145. Pin 124 prevents complete retraction of blowdown needle 121. Chamber 145 is connected to body cavity 146 via service port 129, which is normally blocked by inner seat retainer 109.

The inlet port 125 to the pilot valve is also in fluid communication with the underside of sense diaphragm 107 via passageway 126 and hole 127. An important feature is that passageway 128 is offset upward along passageway 126 from the inlet port 125 such that fluid moving upward through passageway 126 must pass by the opening to passageway 128. The pilot actuated tank vent valve fails in the open position because the passageway from the pilot inlet to the vent valve actuator is offset from the pilot inlet such that fluid passing to the sensing diaphragm of the pilot must pass the opening to the passageway to the vent valve actuator such that if the sensing diaphragm ruptures the flow through the rupture will cause a decrease in pressure on the vent valve actuator diaphragm allowing the vent to open.

Figure 3:
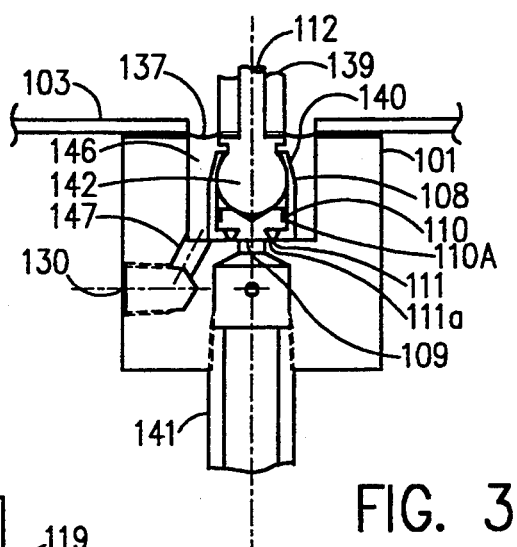
FIG. 3 is a detail taken along line A—A of FIG. 1.

Referring now to FIG. 3 the pilot outlet port 130 is shown to be at a 90° angle of the view of FIG. 1 along A—A. The outlet port 130 is in communication with body cavity 146 via passageway 147.

Figure 2:
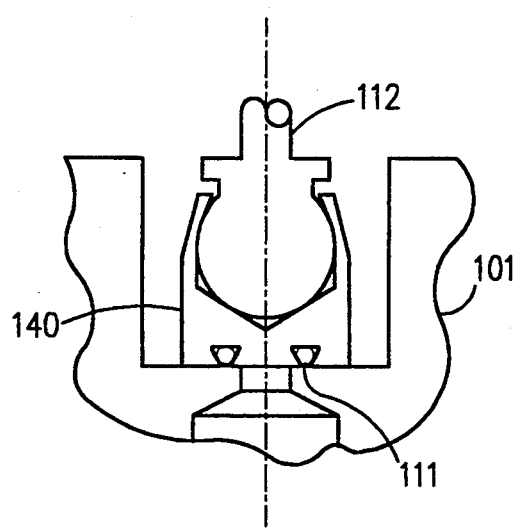
FIG. 2 is a detail of another embodiment of the pilot seat seal and inner seat retainer.

Referring now to FIG. 2 a second embodiment of the seat 140 is shown which is of a single piece construction. The upper portion of seat 140 retains the ball 142 in place. The single piece construction requires only one O ring 111. The two piece design shown in FIG.'s 1 and 3 allows for easier machining of difficult to machine materials.

Figure 6:
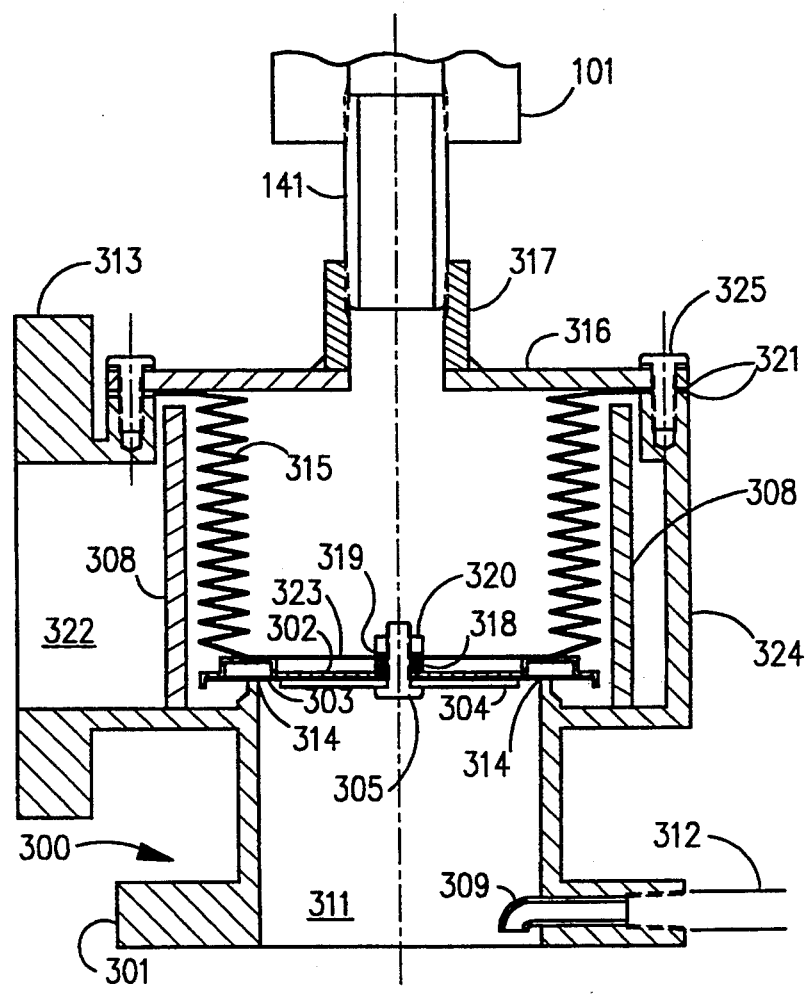
FIG. 6 a is cross sectional elevation of an alternative embodiment of the actuator of the present invention.

FIG. 6 is an alternative embodiment for actuator 200. A bellows 315 attaches directly to the pallet 302 on bottom plate 323 by passing bolt 305 through a central opening in the bottom plate 323 and clamping it between seal spacer 318, nut 320 and lockwasher 319. The actuator comprises a frame 324 which in the case of the pipe away configuration shown in FIG. 6 is a closed container, with closure 316 mounted over the upper end and secured with bolts 325 and annular seal 321 which is the upper end of bellows 315. The closure has neck 317 into which the remainder of the apparatus as described for FIG. 1 is attached.

Figure 4:
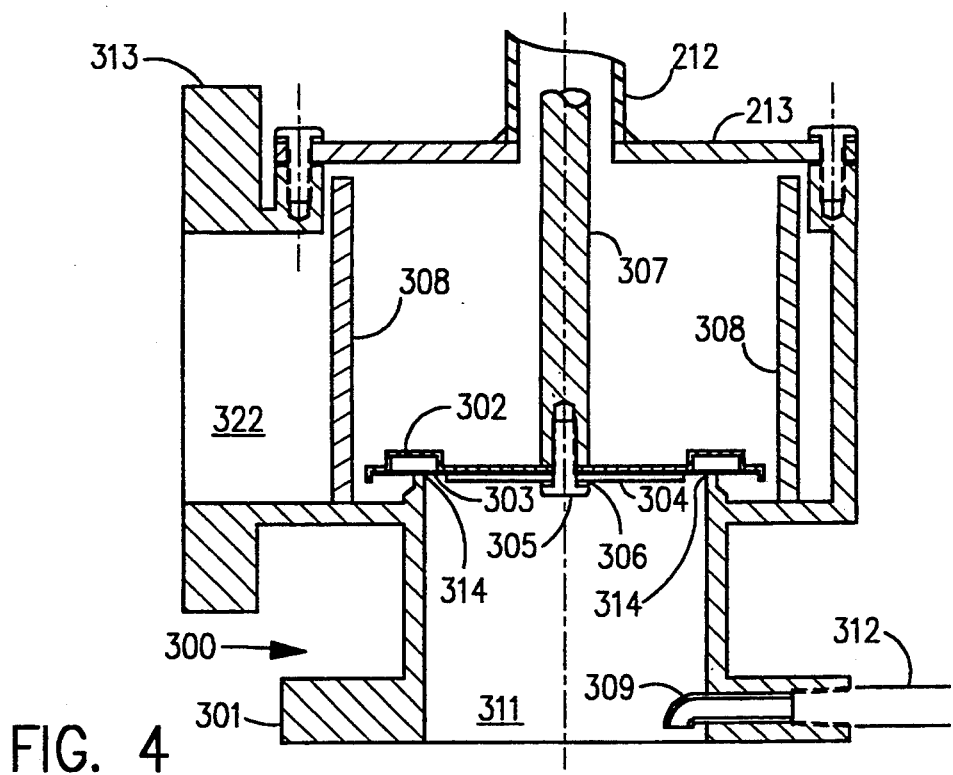
FIG. 4 is an elevational view in partial cross section of a pipe away vent valve onto which a pilot operated actuator may be mounted.

Referring now to FIG. 4 there is shown a pipe away tank vent valve 300 wherein the valve body 301 includes an outlet 322 at right angles to the inlet. The outlet 322 is provided with a flange 313 for attachment to a header (not shown). At the upper end of nozzle 311 is annular seat 314 within the valve body 301 for pallet 302. In the embodiment shown the actuator (not shown) is secured to the top of the body by mounting plate 213. The remainder of the apparatus above the nipple 212 is identical to that shown in FIG. 1. In addition the outlet port 130 of the pilot may also be connected to outlet 322 (FIG. 5) or to the header 400.

In normal operation tank pressure is sensed at the pressure sensing tube 309 in the vent valve 300 and is directed to pilot inlet port 125 via conduit 312. Alternatively the tank pressure may be sensed remotely and directed to the pilot inlet port 125 via conduit 312a. The pressure is directed to the sense chamber 136 through passageway 126 at the same time into actuator chamber 216 through passageway 128, chamber 145 and nipple 141. This pressure is acting upward against the sense diaphragm 107 which is being held down by spring 119. The same pressure is also acting in actuator chamber 216 tending to push downward against actuator diaphragm 203 which in turn is pushing downward against the stem 307 to seat the pallet 302 and diaphragm 303 against the nozzle of the valve body 301. As long as the pressure in the tank is insufficient to lift the sense diaphragm 107 against the force of the spring 119, the pilot and vent valve will remain closed.

When the tank pressure is sufficiently high to lift the sense diaphragm 107 against the spring 119 the seat 140 will open to allow flow through the pilot and out the outlet port 130. This flow will create a pressure drop in the actuator chamber 216 due to pressure escaping from this chamber through the pilot valve outlet port 130. The restriction created by blowdown needle 121 in passageway 128 prevents the tank pressure from coming in as fast as it is being discharged from outlet port 130. When the downward force on the diaphragm support plate 204 is reduced sufficiently due to the drop in the actuator chamber 216 pressure, the vent valve pallet 302 with the full tank pressure pushing upwards will be able to lift and open to relieve the excess tank pressure.

It is highly desirable for a pressure venting device to fail in the open mode if any of its components fail. In the actuator 200 if the actuator diaphragm 203 ruptures pressure will be lost through the tear. Without sufficient force on the upper surface of actuator diaphragm 203 to hold down the vent valve pallet, the pallet will lift to relieve tank pressure, thus failing in the open position.

In the pilot the components that are most susceptible to failure and their failure modes are: (1) the spring 119—breaks, (2) the sense diaphragm 107—ruptures, and (3) the seal diaphragm 137—ruptures.

If the spring 119 breaks the pilot will open due to the reduction of force on the sense diaphragm 107. Normally if the sense diaphragm 107 ruptures and loses pressure in sense chamber 136 there will not be enough lifting force to overcome the downward force of spring 119 and the pilot will fail in the closed position. However, the locations of inlet port 125, passageways 126 and 128 are such that passageway 128 is lateral to passageway 126 and any fluid going to passageway 128 must first travel a short distance along passageway 126. Under normal operation there is no flow along passageway 126 once the sense chamber 136 has been pressurized. A ruptured sense diaphragm 107 will cause flow along passageway 126 through the tear in sense diaphragm 107, up the spring bonnet 104 and out the vent bug screen 120. The flow along passageway 126 and across the lateral passageway 128 forms a suction (aspirator) effect in passageway 128 such that it will draw pressure out of the actuator chamber 216. This drop in pressure in actuator chamber 216 will cause the vent valve to open, thus failing in the open position. The same result will occur if the seal diaphragm 137 ruptures. The pressure will be vented out through the outlet port 130.

In a pipe away configuration the outlet side of the vent valve and the pilot outlet (if connected to the header or outlet side of the vent valve) are subject to the header pressure. If the header pressure is positive and higher than the tank pressure the higher pressure on the top side of the vent pallet will keep the vent closed, thus acting as a back flow preventer. The sense diaphragm area of the pilot is sized to provide a high surface ratio of sense diaphragm to seal diaphragm, e.g., 10-80:1 (such as a sense diaphragm area of 36 sq. inches versus 0.75 sq. inches for the seal diaphragm, making a ratio of 48:1). The higher-than-tank-pressure acting on the seal diaphragm through the pilot discharge port is not enough to lift open the pilot seat unless the header pressure is greater than tank pressure by the ratio of sense diaphragm to the seal diaphragm. The pressure on the bottom side of the actuator diaphragm, being higher than the pressure on the top side, will tend to lift the diaphragm. But since the diaphragm is not attached to the vent valve stem it will not lift open the vent to allow back flow.

If the header pressure is negative (vacuum) it tends to lift up on the vent pallet. However, negative pressure on the lower side of the actuator diaphragm tends to increase the downward force on the vent valve stem since the actuator diaphragm has a larger effective area than the vent pallet. Negative pressure on the lower side of the pilot seal diaphragm also tends to hold the pilot seat down tighter. Therefore negative header pressure alone will not cause the vent valve to open before the tank pressure reaches the set pressure of the pilot.

Figure 5:
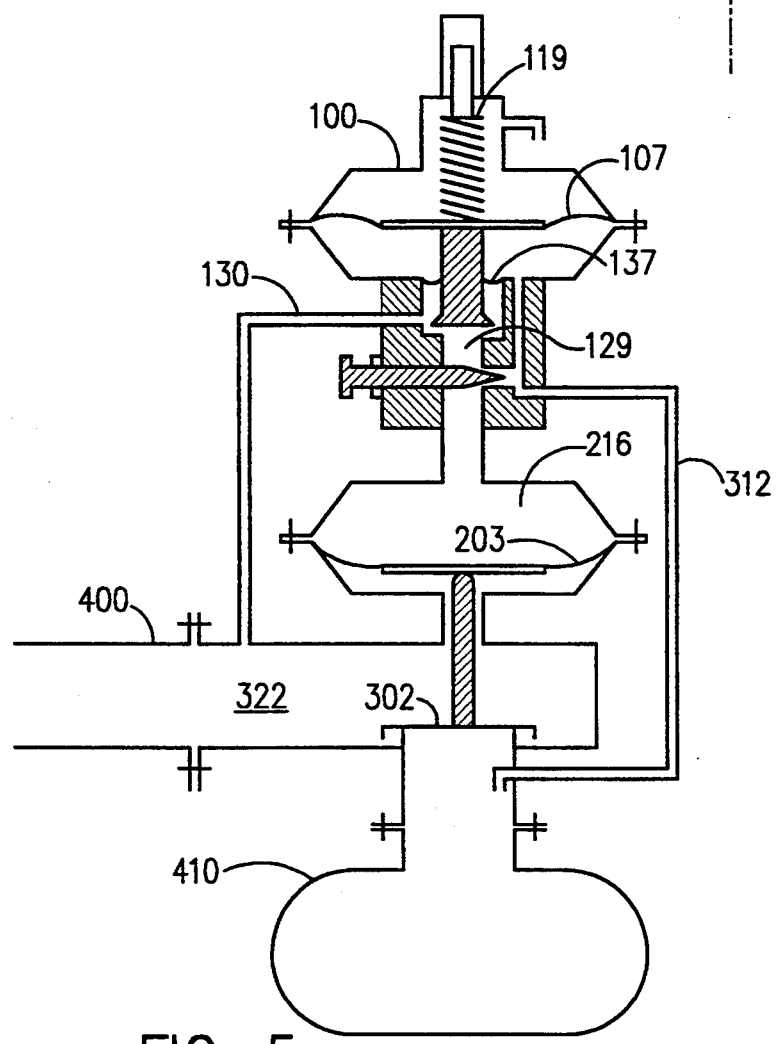
FIG. 5 is a schematic representation of a pipe away of an embodiment of the present invention.

FIG. 5 simplifies understanding operation of the present systems. With a negative pressure (vacuum) in header 400 the vent valve pallet 302 will open when the pressure in tank 410 reaches the pilot set pressure. When the pilot spindle 112 lifts at set pressure opening the service port 129, the actuator chamber 216 will lose pressure due to the vacuum in the header and will draw out the pressure via the pilot outlet port 130. With sufficient vacuum in the header the actuator can reach a vacuum state. As the downward force of the actuator diaphragm 203 diminishes, the combined tank pressure on the bottom side of the vent valve pallet 302 plus the vacuum on the top side will lift open the vent valve to relieve tank pressure.

Figure 7:
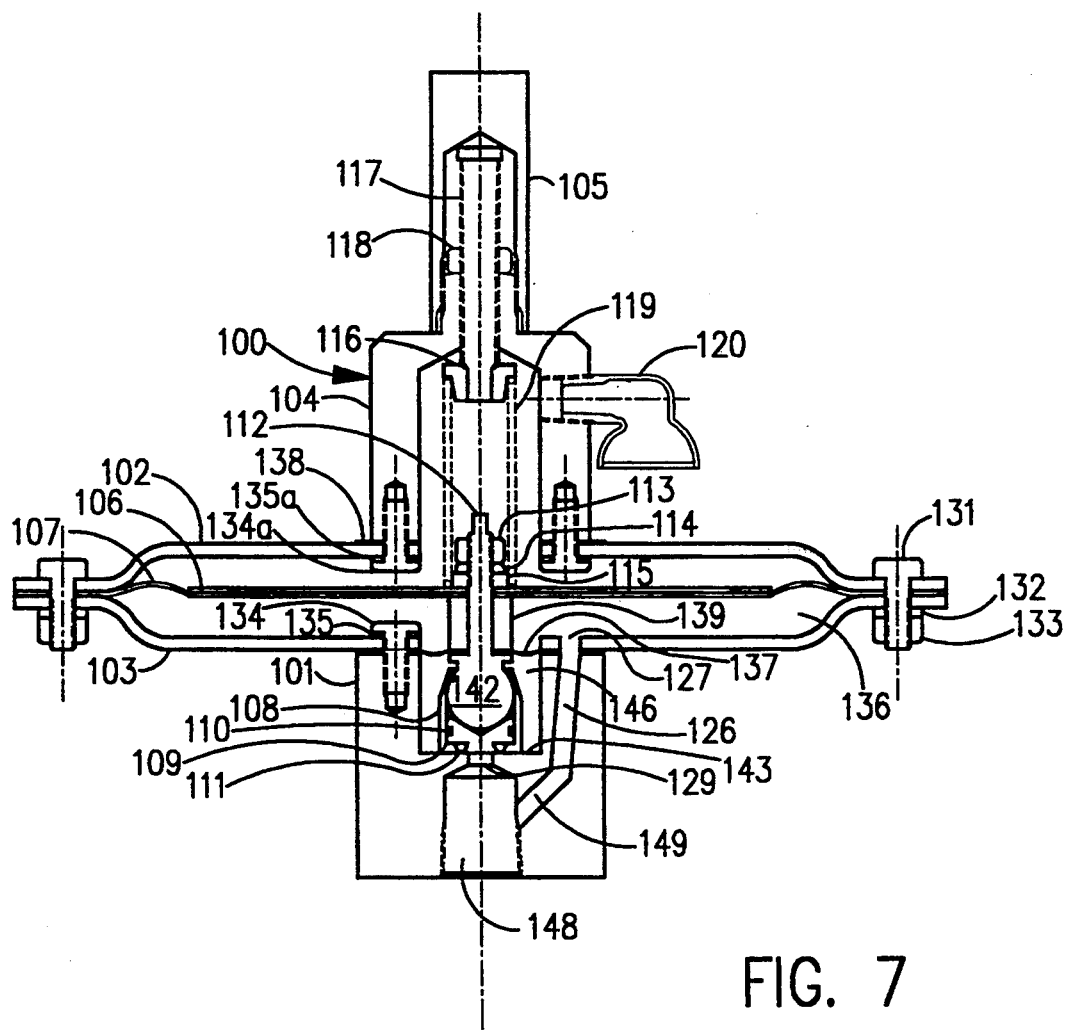
FIG. 7 is an embodiment wherein the pilot valve is a spring operated pressure relief valve.

A small spring operated pressure relief valve may be made from the pilot portion of the Pilot Operated Vent Actuator. Referring to FIG. 7, the valve is virtually identical to the pilot 100 in FIG. 1 with the exception of the omission of the blowdown needle 121, locknut 122, seal 123, and inlet port 125. The chamber 145 in FIG. 1 becomes the inlet 148 in FIG. 7.

Pressure from the tank enters the valve at inlet 148 and is directed to the sense chamber 136 via passageways 149 and 126. The tank pressure also acts against the seat through service port 129. When the tank pressure acting against the sense diaphragm 107 is sufficient to lift the diaphragm against the force of spring 119 (the set pressure) the seat will move upwards to open the valve and allow excess tank pressure to escape through service port 129, passageway 147, and out the outlet port 130. When the tank pressure drops below the set pressure the force of spring 119 will be able to close the valve.

The invention claimed is:

1. A pilot actuated tank pressure vent valve for mounting on a tank comprising in combination:
   (a) a vent valve body having a pallet which seats on a nozzle to seal the valve;
   (b) a pallet actuator mounted on said vent valve body and having a pressure responsive member mechanically linked to said pallet, the upper surface of said pressure responsive member being in fluid communication with the pressure in said tank through;
   (c) a pilot valve mounted on said pallet actuator and having (1) a spring loaded sensing actuator, (2) a spindle connected to and operated by said sensing actuator, (3) an inlet port in fluid communication with the pressure in said tank, (4) a first passageway for communicating said pressure from said inlet port to said pallet actuator, (5) a second passageway for communicating said pressure from said inlet port to the under side of said sensing actuator and (6) a seating mechanism connected to said spindle for sealing an opening between said first passageway and an outlet port, said first passageway being offset from said inlet port such that any fluid flowing through said inlet port and into said second passageway must pass the opening of said first passageway.

2. The pilot actuated tank pressure vent valve according to claim 1 further comprising an adjustable restriction within said first passageway.

3. The pilot actuated tank pressure vent valve according to claim 1 wherein the lower end of said spindle is in the form of a ball and is received in a socket in the upper portion of said seating mechanism such that said seating mechanism will seal said opening if said spindle is not in perfect alignment.

4. The pilot actuated tank pressure vent valve according to claim 1 further comprising a sensing tube within said vent valve body and which is in fluid communication with said inlet port.

5. The pilot actuated tank pressure vent valve according to claim 1 further comprising a sensing tube connected to the internal pressure of said tank in a position remote from said vent valve body.

6. The pilot actuated tank pressure vent valve according to claim 1 wherein further comprising a vent valve outlet port which discharges to the atmosphere.

7. The pilot actuated tank pressure vent valve according to claim 1 wherein further comprising a vent valve outlet port which discharges to a manifold.

8. The pilot actuated tank pressure vent valve according to claim 1 wherein said first passageway is lateral to said second passageway.

9. The pilot actuated tank pressure vent valve according to claim 1 wherein said pallet actuator comprises a diaphragm.

10. The pilot actuated tank pressure vent valve according to claim 1 wherein said pallet actuator comprises a bellows.

11. The pilot actuated tank pressure vent valve according to claim 1 wherein said spindle comprises a ball seated in a socket thereby providing for self aligning.

12. A pilot actuator for operating a tank vent valve comprising:

(a) a body having a body cavity, an inlet port, an outlet port and a service port;
(b) a sensing chamber connected to said body and in fluid communication with said outlet port by a first passageway;
(c) a sensing diaphragm disposed within said sensing chamber;
(d) an adjustable spring mounted on said sensing diaphragm and providing a downward force thereon;
(e) a second passageway connecting said inlet port to said sensing diaphragm, a third passageway connecting said inlet port to said service port, said third passageway being offset from said inlet port and along said second passageway such that any fluid flowing through said inlet port and along said second passageway must pass the opening of said third passageway;
(f) a spindle attached to said sensing diaphragm at the upper end and to a seating mechanism at the lower end within said body cavity, said seating mechanism blocking said service port.

13. The pilot actuator according to claim 12 further comprising an adjustable restriction within said third passageway.

14. The pilot actuator according to claim 12 wherein the lower end of said spindle is in the form of a ball and is received in a socket in the upper portion of said seating mechanism such that said seating mechanism will seal said opening if said spindle is not in perfect alignment.

15. The pilot actuator according to claim 12 wherein the body cavity is separated from said sensing chamber by a seal diaphragm and said spindle passes through said seal diaphragm.

16. The pilot actuator according to claim 15 further comprising a rigid spacing element around said spindle between said sensing diaphragm and said seal diaphragm.

17. The pilot actuator according to claim 12 further comprising a spring bonnet mounted on an upper surface and around said spring.

18. The pilot actuator according to claim 12 wherein said third passageway is lateral to said second passageway.

19. The pilot actuator according to claim 12 wherein said spindle comprises a ball seated in a socket thereby providing for self aligning.

20. The pilot actuator according to claim 12 wherein said inlet is adapted for direct attachment on a tank.

* * * * *